UNITED STATES PATENT OFFICE.

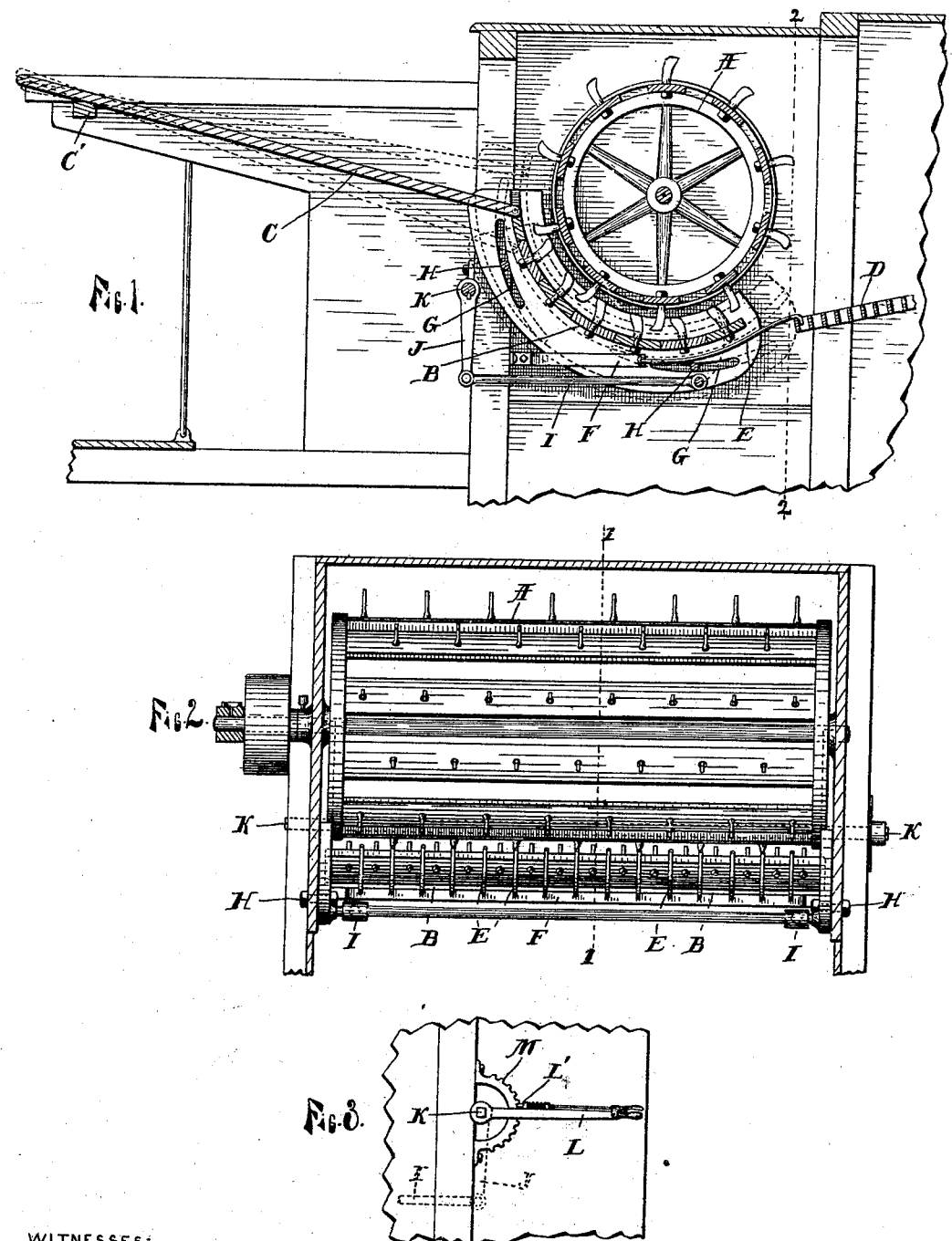

FREELAND C. SNEDEN, OF GRAND RAPIDS, MICHIGAN, ASSIGNOR OF ONE-FOURTH TO AMOS POE, OF SAME PLACE.

THRESHING-MACHINE.

SPECIFICATION forming part of Letters Patent No. 671,118, dated April 2, 1901.

Application filed December 22, 1898. Serial No. 700,081. (No model.)

*To all whom it may concern:*

Be it known that I, FREELAND C. SNEDEN, a citizen of the United States, residing at Grand Rapids, in the county of Kent and State of Michigan, have invented certain new and useful Improvements in Threshing-Machines; and I do hereby declare the following to be a full, clear, and exact description of the invention, such as will enable others skilled in the art to which it appertains to make and use the same.

My invention relates to improvements in threshing-machines, and more particularly to the means of adjusting the concave and feed-board relative to the cylinder of the same.

Experience has demonstrated that in threshing damp or "tough" grain the feed-board should be adjusted high at the end adjacent to the cylinder and more nearly level, and the concave should also be higher at the front and closer to the cylinder throughout. The feeding is thus rendered much slower and more nearly radial to the cylinder. There is also a greater intermeshing of the teeth on the cylinder and concave and a narrow space for the passage of the straw between the same. So, also, for threshing drier or more easily separated grain the reverse is best. The feed-board should be lowered at the side adjacent to the cylinder and at a greater inclination, the concave also being lowered at the front and removed farther from the cylinder throughout, whereby the straw is fed down a steeper incline more nearly tangential to the cylinder, a wider space provided for its passage between the cylinder and concave, and the teeth on the same intermesh a less distance.

The object of my invention is, primarily, to effect the heretofore-described proper adjustment of the feed-board and concave simultaneously by the movement of a single lever and by mechanism simple and effective and adapted to be operated instantaneously and without stopping the machinery.

My invention consists, essentially, in providing the concave with slotted openings eccentric to the axis of the cylinder and having the front ends of said openings inclined toward said axis, pins engaging said openings and supporting the concave, whereby the concave is at all times concentric to the cylinder and moves toward the same when raised at the front and from the same when lowered at the front, also in pivoting the feed-board at its inner end to the forward end of the concave and slidably supporting the outer end thereof, and means for instantaneously adjusting both said concave and feed-board by the movement of a single lever, the structure thus being simplified and more readily and properly adjusted.

It also consists of an improved device beneath the concave to convey the straw to the grating of the cylinder and certain other new and useful features hereinafter more fully described, and particularly pointed out in the claims, reference being had to the accompanying drawings, in which—

Figure 1 is a longitudinal vertical section on the line 1 1 of Fig. 2, showing a portion of a threshing-machine embodying my invention; Fig. 2, a transverse section of the same on the line 2 2 of Fig. 1; and Fig. 3, a detail of the adjusting-lever and sector.

Like letters refer to like parts in all of the figures.

A represents the cylinder; B, the concave; C, the feed-board, and D the stationary grating at the rear of the cylinder.

E indicates a series of parallel rods extending from a fixed transverse bar F, located beneath the concave, to the grating D. These rods serve to bridge the variable gap between the concave and the grating and present a surface adapted to permit the straw to pass freely over the same to the grating and also permit of adjusting the concave without changing the position of the grating or bars.

The concave B is provided with a downwardly-projecting segmental flange at each end arranged concentric with the axis of the cylinder and provided with curved slots G G near each end, which slots are arranged eccentric to the axis of the cylinder, the forward ends of the slots being inclined toward said axis. It is important that the front end of the slots be nearest to the axis of the cylinder; otherwise the concave will not approach the same as it rises, which is necessary to proper adjustment.

H H are pins fixed in the casing of the machine, each being the same distance from the axis of the cylinder and engaging the respective slots G G in the concave B.

K is a rock-shaft extending across the front of the machine-frame and provided at each side of the machine with depending arms J, rigidly secured thereto and connected at their lower ends to the concave B by rods I to adjust the concave on the pins H H. The rock-shaft K is provided at one end with a lever L, having a latch L' engaging a notched sector M, whereby said shaft is rotatively adjusted and secured. The feed-board C rests and slides longitudinally at its outer end on the cross-bar C' and at its inner end is pivotally attached to the forward side of the concave B, whereby the inner end of the feed-board moves with the concave as it is adjusted and the outer end thereof slides on the bar C'.

From the foregoing description the operation of my device is obvious. By means of the lever L and its latch and sector the concave may be adjusted on the pins H and held in place. When adjusted forward and upward, the rods E serve to carry the straw freely from the concave to the grating. For threshing damp or other grain difficult to thresh the lever L is raised. This slides the concave forward and upward on the pins H, raising it at the front side, and at the same time it approaches closer to the cylinder, remaining in all positions concentric therewith, and simultaneously the feed-board rises at the inner end. This is the most desirable adjustment, for that the more level position of the feed-board, feeding more directly toward the axis of the cylinder, striking the straw more nearly at right angles, and the deeper meshing of the teeth of the cylinder and concave all tend to retard the flow of straw through the machine and subject the same to more thorough beating out of the grain. It will be observed that all of these changes of relative position are accomplished simultaneously by a single movement of a single lever, which can be instantly shifted while the machine is running, without even stopping the threshing process. It follows, of course, that reversing the adjustment by lowering the lever L reverses all of the foregoing adjustments, the inner end of the feed-board descending and the concave receding from the axis of the cylinder, whereby the straw feeds down a steeper incline, engages the periphery of the cylinder at a more acute angle, and finds freer passage between the cylinder and concave. This results in the best adjustment of these parts for rapid treatment of grain easy to thresh and requiring less vigorous beating out of the grain from the straw.

Having thus fully described my invention, what I claim, and desire to secure by Letters Patent, is—

1. In a threshing-machine, in combination with the cylinder, a concave having slots eccentric to the axis of the cylinder and arranged with their front ends inclined toward the same, fixed pins adapted to traverse said slots, and supporting the concave, and means for adjusting and holding said concave, whereby it rises at the front and approaches the cylinder, and descends at the front and recedes from the cylinder, and means for simultaneously adjusting the feed-board and concave, substantially as described.

2. In a threshing-machine, the combination of a cylinder, a concave having flanges at each end each flange having two curved slots eccentric to the axis of the cylinder and with their forward ends inclined toward the same, fixed pins engaging said slots, a feed-board pivoted at its inner end to the forward side of the concave and slidable on a cross-bar at its outer end and means for adjusting the concave on the pins, substantially as described.

3. In a threshing-machine, in combination with a cylinder, a stationary grating, and an adjustable concave; a fixed transverse bar beneath the concave and cylinder, and parallel rods extending from the bar to the grating, substantially as described.

4. In a threshing-machine, the combination of a cylinder, a concave having a flange at each end, each flange having two curved slots arranged eccentric to the axis of the cylinder and with their front ends inclined toward the same, fixed pins engaging said slots, means for adjusting the concave on the pins, a grating at the rear of the concave, a fixed bar beneath the concave, parallel rods from the bar to the grating, and a feed-board pivotally connected at its inner end to the forward side of the concave and slidably supported at the outer end, substantially as described.

In testimony whereof I affix my signature in presence of two witnesses.

FREELAND C. SNEDEN.

Witnesses:
LYDIA M. SNEDEN,
L. E. FLANDERS.